(12) United States Patent
Sutherland (10) Patent No.: US 7,054,858 B2
(45) Date of Patent: May 30, 2006

(54) SYSTEM AND METHOD FOR RETRIEVAL OF OBJECTS FROM OBJECT TO RELATIONAL MAPPINGS (75) Inventor: James Bryce Sutherland, Ottawa (CA)

(73) Assignee: OIC Acquisition Corporation, Redwood Shores, CA (US)

( * ) Notice: Subject to any disclaimer, the term of this patent is extended or adjusted under 35 U.S.C. 154(b) by 759 days.

(21) Appl. No.: 09/920,790

(22) Filed: Aug. 1, 2001

(65) Prior Publication Data
US 2003/0028551 A1 Feb. 6, 2003

(51) Int. Cl.
G06F 17/30 (2006.01)

(52) U.S. Cl. ........................ 707/4; 707/101; 707/103 R
(58) Field of Classification Search .............. 707/1–10, 707/100–104.1, 200–206
See application file for complete search history.

(56) References Cited

U.S. PATENT DOCUMENTS

| 5,499,371 | A | | 3/1996 | Henninger et al. ......... 395/700 |
| 5,615,362 | A | | 3/1997 | Jensen et al. ............... 395/614 |
| 5,706,506 | A | | 1/1998 | Jensen et al. ............... 395/614 |
| 5,799,309 | A | * | 8/1998 | Srinivasan .................. 707/102 |
| 6,078,926 | A | | 6/2000 | Jensen et al. ............... 707/103 |
| 6,101,502 | A | | 8/2000 | Heubner et al. ........... 707/103 |

* cited by examiner

Primary Examiner—Jean M. Corrielus
Assistant Examiner—Joon Hwan Hwang
(74) Attorney, Agent, or Firm—Park, Vaughan & Fleming LLP (57) ABSTRACT A retrieval system generates a retrieval query for batch reading of related objects when a source object is read from the database. The related objects include nested objects and/or many-to-many relationship objects. It generates a single retrieval query for each type in each level of nested objects using its parent query. Also it generates a retrieval query to retrieve a collection of target objects having many-to-many relationships with a collection of source objects.

28 Claims, 6 Drawing Sheets

SYSTEM AND METHOD FOR RETRIEVAL OF OBJECTS FROM OBJECT TO RELATIONAL MAPPINGS

This invention relates to a system and method for retrieval of objects from object to relational mappings, and more particularly, to a system and method for retrieval of objects having many-to-many relationships from a relational database.

BACKGROUND OF THE INVENTION

Object model technology is becoming more popular for building enterprise applications. However, many organizations have already developed relational databases and have their corporate data stored in those databases. Accordingly, it is desirable to provide a mechanism to allow object applications to manipulate objects in relational databases, i.e., write, read, delete and update objects in or from the relational databases. Object-oriented applications are built using object models with inheritance and relationships, whereas relational databases consist of flat tables and foreign keys. It is desired to be able to represent the raw database data as application objects. Databases are queried through a database query language, such as Structured Query Language (SQL), however it is desirable to query objects at the object level and through traversing the object model.

In an object model for a many-to-many relationship, each source object contains a collection of target objects. The source object contains references to the target objects. In a relational database, a many-to-many relationship is defined through the use of an intermediate join table. When a collection of source objects is read from the database, each of the collection of target objects of the source objects needs to be populated. For a single source object, only a single query is required. When many sources objects are queried, one query is required for each source object. This includes navigation from other one-to-many or many-to-many relationships. In some known systems, reading the target objects requires a database query for each source object to obtain its target objects. This requires n queries to the database given n original source objects, which hinders application performance due to an overhead associated with each individual database query.

In addition, object models can consist of complex interconnected graphs of related objects. A set of source objects could have a relationship of one-to-one, one-to-many or many-to-many to a set of target objects, which in turn could have a relationship to a set of related objects, and so on. In existing systems, the number of database queries required to read in the entire graph of objects is relative to the number of objects and the depth of the relationships. For example, consider a 3 level depth of related objects, on a root level query from application for 100 source objects for the related objects, each with a collection of 10 related objects, each with a collection of 10 other related objects. This requires 1+100+1000 or 1,101 database queries, and would be a performance hindrance to the application.

To load target objects for single level one-to-one and one-to-many relationships, it is known to use an existing solution which reads all of the relevant target objects for all of the source objects in a single query that joins the target table to the original source table query. The source and target objects are then matched together in-memory based on their foreign key information.

This existing solution only supports one-to-one and one-to-many relationship and not many-to-many relationships. For one-to-one and one-to-many relationships, the objects read from the database contain foreign key information for their relationships that allows them to be matched together. However, there is no such information stored in the objects read from the database for many-to-many relationships, making the problem significantly more difficult.

Also, this existing solution only supports optimizing a single level of relationships and does not support nested optimization. This limits the scenarios that the optimization could be applied and limited the degree of the optimization.

It is therefore desirable to provide a system and method which allows retrieval of objects having nested relationships and many-to-many relationships from the database.

SUMMARY OF THE INVENTION

It is an object of the invention to provide a novel system and method for retrieving objects having nested relationships and/or many-to-many relationships from a relational database that obviates or mitigates at least one of the disadvantages of existing systems.

The present invention generates a retrieval query for batch reading of related objects when a source object is read from the database. The related objects include nested objects and/or many-to-many relationship objects. It generates a single retrieval query for each type of relationships at each level of nested objects using its parent query. Also it generates a retrieval query to retrieve a collection of target objects having many-to-many relationships with a collection of source objects.

In accordance with an aspect of the present invention, there is provided a method for retrieving target objects stored in a relational database to which an object model is mapped. The method comprises steps of generating a retrieval query to read target objects for a collection of source objects, the collection of source objects having many-to-many relationships with the target objects, the collection of source objects and target objects being respectively stored in one or more source tables and target tables in the database, and the many-to-many relationship being defined in the database by using an intermediate join table of the source tables and the target tables; selecting join table information from the many-to-many join table relating to the collection of source objects and the target objects to enable matching of the target objects and the source objects using the join table information; and retrieving the matched target objects by executing the retrieval query on the database.

In accordance with another aspect of the present invention, there is provided a method for retrieving objects stored in a relational database to which an object model is mapped. The method comprises steps of obtaining nested specification information representing joins relating to a source object and related objects which are joined with the source object with multi-level relationships; obtaining parent query information representing a parent query for reading one or more parent objects at a parent level; generating a nested query for querying objects of next lower level which is next lower than the parent level; appending to the nested query the parent query information and the joins using the nested specification information; and retrieving the objects of next lower level by executing the nested query on the database.

In accordance with another aspect of the present invention, there is provided a retrieval system for retrieving target objects stored in a relational database to which an object model is mapped. The retrieval system comprises a query generator for generating a retrieval query to read target objects for a collection of source objects, the collection of source objects having many-to-many relationships with the target objects, the collection of source objects and target objects being respectively stored in one or more source tables and target tables in the database, and the many-to-many relationship being defined in the database by using an intermediate join table of the source tables and the target tables; a join table information handler for selecting join table information from the many-to-many join table relating to the collection of source objects and the target objects to enable matching of the target objects and the source objects using the join table information; and a batch reading handler for retrieving the matched target objects by executing the retrieval query on the database.

In accordance with another aspect of the present invention, there is provided a retrieving system for retrieving objects stored in a relational database to which an object model is mapped. The retrieval system comprises an information receiver function for obtaining nested specification information representing joins relating to a source object and related objects which are joined with the source object with multi-level relationships; a query generator for generating a nested query for querying objects of next lower level to parent objects which are queried by a parent query; and a batch reading handler for appending to the nested query information of the parent query and the joins using the nested specification information, and retrieving the objects of next lower level by executing the nested query on the database.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1A:
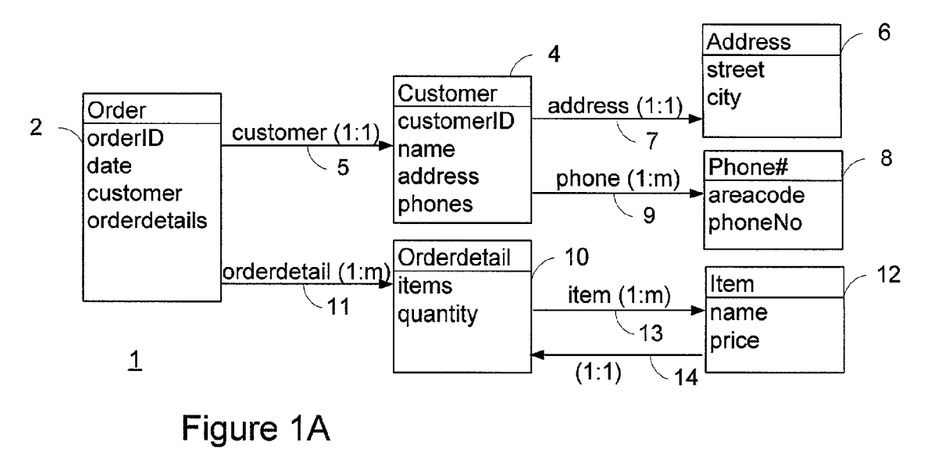
FIG. 1A is a diagram showing an example of related object classes in an object model having two level one-to-one and one-to-many relationships.

FIG. 1A shows examples of two levels of relationships between object classes of an object model 1. The object model 1 contains object classes, Order 2, Customer 4, Address 6, Phone# 8, Orderdetail 10 and Item 12. Order 2 has a primary key OrderID. Order 2 has a customer attribute, each value of which references to a customer object in Customer 4. Thus, Order 2 and Customer 4 have a one-to-one relationship. In this example, objects in Order 2 are source objects and their target objects are the customer objects in Customer 4. This one-to-one relationship is provided in source objects in Order 2 as shown in arrow 5.

Further, the customer objects in Customer 4 have related or nested objects, i.e., address objects in Address 6 and phone objects in Phone# 8. Customer 4 has an address attribute and a phone attribute. The value of the address attribute references to an address object in Address 14. Thus, Customer 4 and Address 6 have a one-to-one relationship 7. Phone# 8 contains phone numbers. A single customer in Customer 4 may have zero or more phone numbers, and a value of each phone attribute references to one or more phone objects in Phone# 8. Thus, Customer 4 and Phone# 8 have a one-to-many relationship 9. Thus, Order 2, Customer 4 and Address 6 or Phone# 8 have two level relationships.

Similarly, Order 2, Orderdetail 10 and Item 12 have two levels of one-to-many relationships 11 and 13.

Figure 2A:
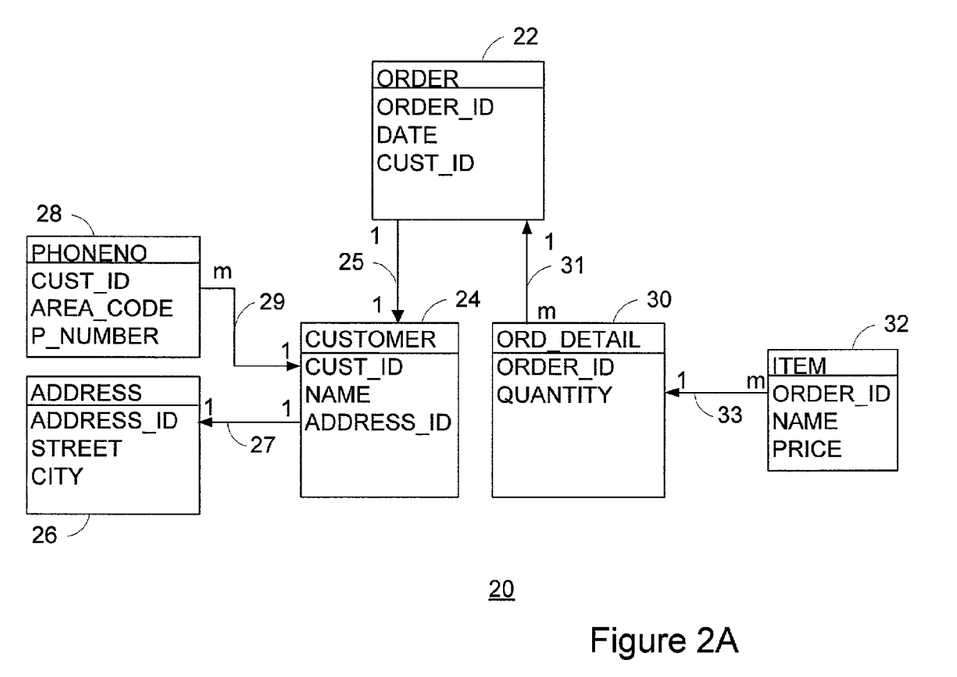
FIG. 2A is a diagram showing an example of tables in a relational database having two level one-to-one and one-to-many relationships.

FIG. 2A shows an example of tables of a database 20 to which the object classes of object model 1 maps. The database 20 contains tables: ORDER 22, CUSTOMER 24, ADDRESS 26, PHONENO 28, ORD_DETAIL 30 and ITEM 32. ORDER 22 has a primary key ORDER_ID and a foreign key CUST_ID. CUSTOMER 24 has a primary key CUST_ID and a foreign key ADDRESS-ID. PHONENO 28 has CUST_ID as a foreign key. Through the foreign keys, ORDER 22, CUSTOMER 24, ADDRESS 26 and PHONENO 28 are related as shown with arrows 25, 27 and 29. Similarly, ORD-DETAIL 30 has a foreign key ORDER_ID. ITEM 32 has a foreign key ORDER-ID. Through these foreign keys, ORDER 22, ORD_DETAIL 30 and ITEM 32 are related as shown with arrows 31 and 33.

Figure 1B:
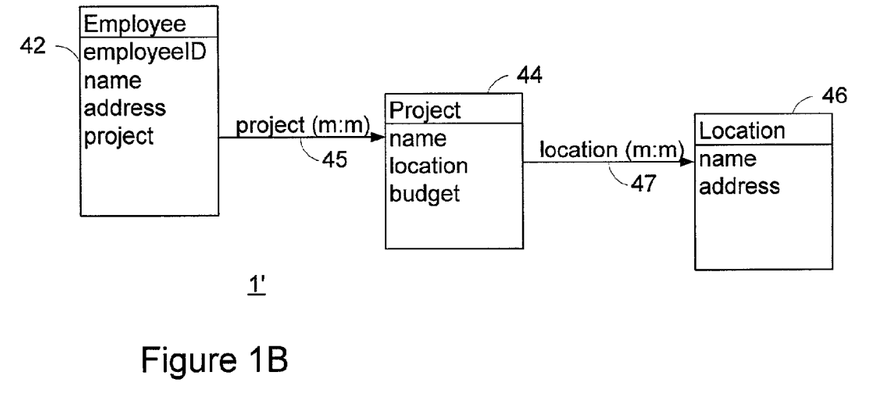
FIG. 1B is a diagram showing an example of related object classes in an object model having two level many-to-many relationships.

FIG. 1B shows an example of two levels of many-to-many relationships between object classes of object model 1'. The object model 1' contains object classes, Employee 42, Project 44 and Location 46. Employee 42 has a primary key employeeID. Project 44 contains project details. One employee may work for multiple projects, and one project may involve multiple employees. Thus, Employee 42 and Project 44 have a many-to-many relationship. In this example, objects in Employee 42 are source objects and relevant target objects are those in Project 44. The information referencing this many-to-many relationship is provided in the source objects in Employee 42 as shown in arrow 45. The target objects in Project 44 do not have any knowledge, relationship to or foreign key information of their corresponding source objects in Employee 42.

Similarly, Project 44 has references to Location 46. Location 46 stores location details. One project may be carried out in multiple locations and one location may be used for multiple projects. Thus, Project 44 and Location 46 have a many-to-many relationship 47. Employee 42, Project 44 and Location 46 have two level many-to-many relationships, with Location 46 nested in Project 44.

Figure 2B:
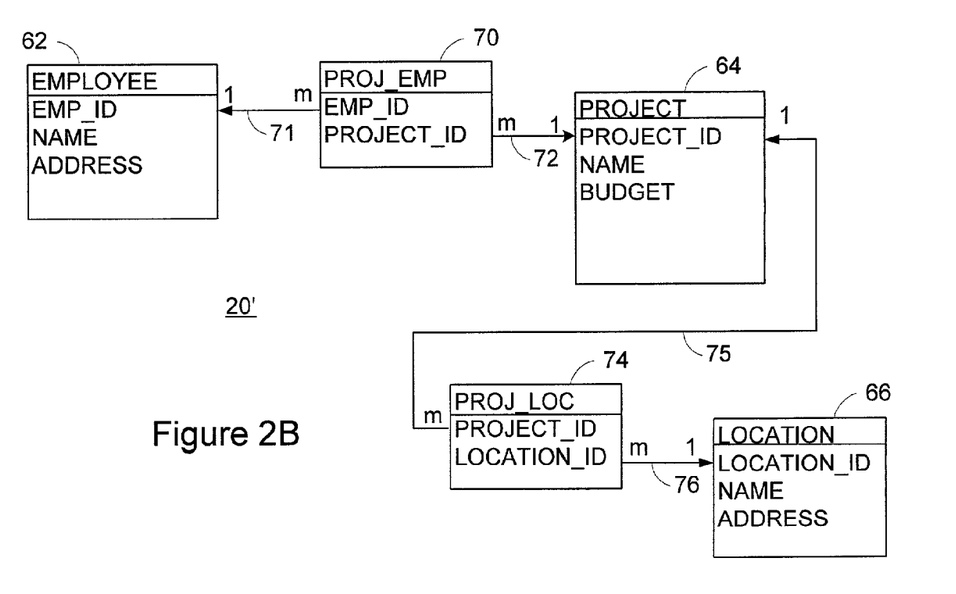
FIG. 2B is a diagram showing an example of tables in a relational database having two level many-to-many relationships.

FIG. 2B shows an example of tables of database 20' to which the object classes shown in FIG. 1B maps. The database 20' contains tables: EMPLOYEE 62, PROJECT 64 and LOCATION 66, that correspond to the object classes 42, 44, 46 in the object classes 42, 44 and 46 shown in FIG. 1B. The database 20' also contains an intermediate join table PROJ_EMP 70 to define the many-to-many relationship between EMPLOYEE 62 and PROJECT 64, and an intermediate join table PROJ_LOC 74 to define the many-to-many relationship between PROJECT 64 and LOCATION 66. EMPLOYEE 62 has a primary key EMP_ID. PROJ_EMP 70 has EMP_ID as a foreign key. As shown with arrow 71, the foreign key in the join table 70 stores a one-to-many relationship between EMPLOYEE 62 and PROJ_EMP 70. Similarly, PROJECT 64 has a primary key PROJECT_ID. PROJ_EMP 70 has PROJECT_ID as a foreign key. As shown with arrow 72, the foreign key in the join table 70 stores a one-to-many relationship between PROJECT 64 and PROJ_EMP 70. Thus, the many-to-many relationship between EMPLOYEE 62 and PROJECT 64 is defined through the join table PROJ_EMP 70. Similarly, the many-to-many relationship between PROJECT 64 and LOCATION 66 is defined through the join table PROJ_LOC 74 with two one-to-many relationships 75 and 76.

Figure 3A:
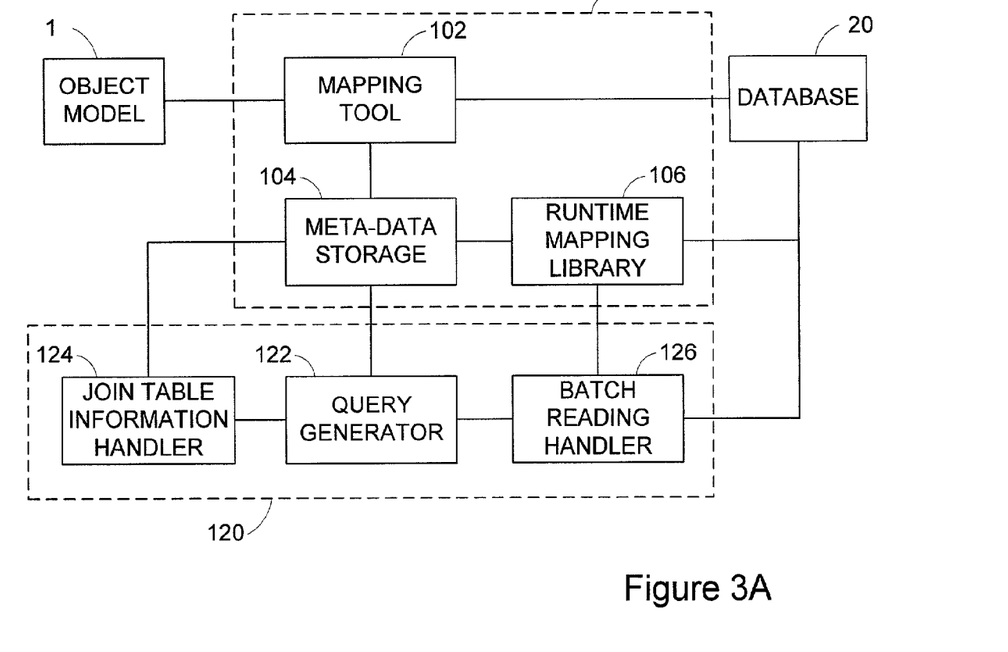
FIG. 3A is a block diagram showing a retrieval system in accordance with an embodiment of the present invention.

FIG. 3A shows an example of an object to relational mapping system 100 to which an object retrieval system 120 in accordance with an embodiment of the present invention is suitably applied.

The mapping system 100 contains a class mapping tool 102, a meta-data storage 104 and a runtime mapping library 106.

The class mapping tool 102 is a development-time tool that assists developers of the database schema in defining how an object model maps to a database. For example, using this tool 102, a developer maps the object classes, Employee 42, Project 44 and Location 46, of object model 1' shown in FIG. 1B to the tables, EMPLOYEE 62, PROJECT 64 and LOCATION 66, in database 20' as shown in FIG. 2B, respectively. Also, the many-to-many relationships 45, 47 are mapped to foreign keys 71, 72, 75, 76 through the intermediate join tables PROJ_EMP 70 and PROJ_LOC 74, respectively. A graphical tool having a graphical user interface may be suitably used as the class mapping tool 102.

The meta-data storage 104 stores mapping meta-data defining the mapping data of how the object classes map to the tables, and how the relationships map to the foreign keys. The meta-data comprises descriptors and mappings. A descriptor is a set of properties and mappings that describes how an object data is represented in a relational database. The descriptor contains mappings from the class attributes to the table columns, as well as the transformation routines necessary for storing and retrieving attributes. The descriptor acts as the link between the object model and the database representation. A mapping accomplishes the storage and retrieval of an object's attributes in and from the database representation.

The mapping meta-data may be stored in extended Markup Language (XML) files. The XML files are read in at runtime by the retrieval system 120 as further described below. The mapping meta-data is generally generated by the mapping tool 102. However, it may be specified through manually editing the XML file, or through Application Programming Interface (API) code. The meta-data storage 104 is provided external to both the source object classes and target object classes. Thus, there is no need to store additional information in the object classes.

The runtime mapping library 106 is a library storing a set of pre-defined generic mapping methods. The methods are defined such that they are executable on the database in terms of the object model, rather than the relational model.

The runtime mapping library 106 executes the mapping methods on the database using the mapping meta-data to store or retrieve objects in or from the database. This allows users to use the mapping system 100 without knowledge of database access API's or database querying languages, such as Structured Query Language (SQL).

When accessing a relational database using an object oriented language, such as the Java (TM) programming language, it is desirable to express queries in terms of objects, rather than using database query language, such as SQL. The mapping system 100 allows object applications to transparently store and retrieve objects using a relational database. Developers can build sophisticated queries at the object level, rather than using SQL or other database query languages. When objects are read in, not only are the instance variables filled in with data but references to other objects are automatically maintained by the mapping system 100. The referenced objects are traversed by navigating the object model using normal object application methods, such as Java methods, rather than making additional explicit database queries or managing foreign keys. The mapping system 100 supports a variety of complex object models and automatically maintains references between objects in the database. While the embodiment is described using mainly Java and SQL, the invention is not limited to those languages.

The object retrieval system 120 is a runtime component. When target objects have relationships with other related objects, i.e., nested objects, the retrieval system 120 retrieves those nested objects and the relationships, as well as the target objects, when the source objects are retrieved. When a collection of source objects having a many-to-many relationship with a collection of target objects is read from the database, the retrieval system 120 retrieves the collection of relevant target objects and the relationship.

The retrieval system 120 allows batch reading or optimized loading of relevant objects relating to the source objects, including the target objects and their nested objects, through reducing the number of required queries to one per type of relationship or one per level, as further described below. This reduces the number of database queries to a constant number.

For example, consider a three-level depth of related objects, on a root level query from the application for 100 source objects (e.g., in FIG. 1A, 100 orders), each with a collection of 10 target objects (e.g., 10 order details), each with a collection of 10 related objects (e.g., 10 items). In order to retrieve the target objects and related objects (e.g., the order details and related items), the retrieval system 120 uses three database queries; one query for all of the source objects (e.g., orders), one query for all of the target objects (e.g., order details) for all of the source objects, and one query for all of the related objects (e.g., items) for all of the target objects for all of the source objects. As described above, existing systems use 1,101 database queries. Accordingly, the retrieval system 120 provides a significant performance gain to the application, compared to the existing systems. That is, the same amount of data is read in by the retrieval system 120 and the existing systems described above, however, the database traffic is significantly reduced according to the retrieval system 120. Also, there is an overhead, e.g., at the client, network, query and database, associated with each database interaction. This overhead is also reduced by using the reduced number of queries through the reduced database traffic.

The retrieval system 120 comprises a query generator 122, a join table information handler 124 and a batch reading handler 126. The query generator 122 dynamically generates retrieval queries to read relevant objects, including the target objects and their nested objects, for source objects. The batch reading handler 126 passes the query information regarding the upper level retrieval query used for reading objects at upper level to a nested query for reading objects at the next lower level, and appends the additional query information and joins relating to the source object to the nested query, as further described below.

Also, query generator 122 dynamically generates a retrieval query to read all of relevant many-to-many target objects for all of a collection of source objects. To read many-to-many target objects, the join table information handler 124 selects foreign key information from the many-to-many intermediate join table to enable matching of the target and source objects, as further described below.

The batch reading handler 126 executes the retrieval queries generated by query generator 122.

In FIG. 3A, the retrieval system 120 is shown separately from the components of the mapping system 100. However, the components of the retrieval system 120 may be combined with or made as a part of a component of the mapping system 100. For example, the retrieval system 120 may be a part of the runtime mapping library 106 which also manages objects with other relationships, such as a single level one-to-one or one-to-many relationships.

Figure 3B:
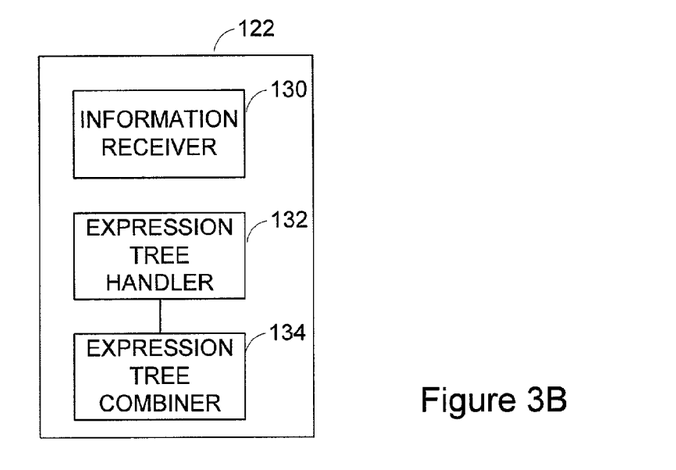
FIG. 3B is a block diagram showing an example of a query generator.

As shown in FIG. 3B, the query generator 122 may have information receiver 130, expression tree handler 132 and expression tree combiner 134. The information receiver 130 obtains information regarding objects and relationships, expression tree handler 132 handles expression trees for representing the relationships between objects, and the expression tree combiner 134 combines expression trees, as further described below.

The functions of the retrieval system 120 are further described in more detail below.

First, the retrieval of multi-level objects is described. To retrieve multi-level objects, the retrieval system 120 generates a single retrieval query for retrieving objects of the same type of relationship in the same level. For example, if objects in a specific level are all related to their parent objects with the same relationship, e.g., one-to-many, the retrieval system 120 generates a single query for the level. If some objects in a specific level relate to the parent objects with a certain relationship, e.g., one-to-one, and the rest of the objects in the same level relate to their parent objects with a different relationship, e.g., many-to-many, then the retrieval system 120 generates two queries for this level.

Figure 4:
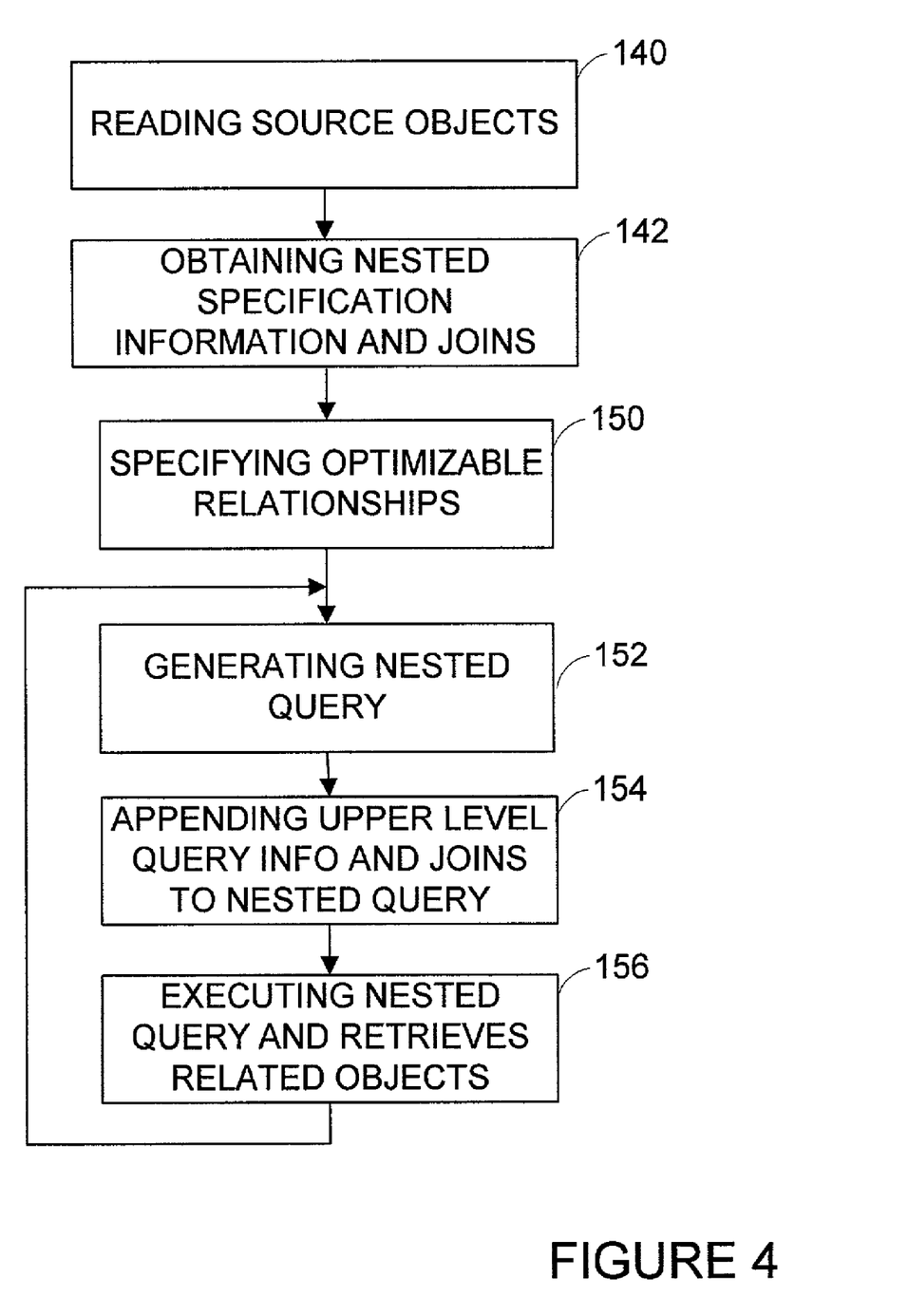
FIG. 4 is a flowchart showing a retrieval of target objects in accordance with an embodiment of the present invention.

FIG. 4 shows a flowchart showing retrieval of target objects and their nested objects and relationships from the database in accordance with an embodiment of the present invention. In this embodiment, target objects and their nested objects are related with the same type of relationship.

A source object is read from the database using a source query at the root level from the application (140). The retrieval system 120 obtains, from the mapping meta-data, nested specification information representing nested joins relating to the source object (142). The nested specification information may be created by the developer of the mapping meta data when the object model classes and relationships are mapped to tables and foreign keys of the database. To create the nested specification information, the developer may use a checkbox in the user interface of the mapping tool 102 shown in FIG. 3A. The mapping meta-data is typically retrieved from the meta-data storage 104 when the mapping system 100 is initialized.

The nested specification information may also be obtained using an Application Programming Interface (API) call in API code. For example, a declarative specification API may be added to individual queries. The declarative specification API allows for nested attributes names to be given using expressions. The API allows for an expression object to be passed as argument, the expression defines arbitrary levels of nested optimization or batch reading. This allows for optimization or batch reading to be specified for complex object graphs and nested level query operations.

Using the nested specification information, the retrieval system 120 specifies, on the source query at the root level from the application, the relationships that may be optimized or batch read to allow for nested specification, i.e., the relationships which allow for batch reading (150). The batch readable relationships may be specified on the source query using attributes of the target objects and nested objects. For the example shown in FIG. 1B, the nested attributes may be specified as follows:

batchRead("projects.locations.address").

Alternatively, relationship mappings of the retrieval system 120 may be set to always use batch reading allowing complex multi-level batch reading.

When the batch reading is enabled, the retrieval system 120 generates a single nested query for retrieving objects at the next lower level (152). This is done by passing the information regarding the parent retrieval query for retrieving the upper level objects to the nested query. The parent retrieval query is the source query for the target objects at the first level, and for other nested objects, it is a nested query for querying objects of one level higher than the other nested objects. The retrieval system 120 then appends to the nested query the information of the parent query and joins relating to the source object (154). Each individual join is obtained from the nested specification obtained from the mapping meta-data. For example, for a parent query:

Read all Order with date>June 2001 a nested query is generated such as:

Read all OrderDetail for all Order with date>June 2001

Joins are appended as follows:
 where
  ORDER.ORDER_ID=ORDERDETAIL.ORDER_ID at the next level this is,
 Read all Item for all OrderDetail for all Order with date>June 2001
 where the join ORDERDETAIL.ORDER_ID=ITEM.ORDER_ID The retrieval system 120 executes the nested query and retrieves the related objects (156). Based on the nested specification, the retrieval system 120 repeats steps 152–156 for the next lower level until the related objects of all levels are retrieved.

Thus, the parent query is passed to each relationship mapping or batch reading handler 126, and a single nested query is generated for retrieving nested objects of the next lower level when the retrieval system 120 is building the value into the source object.

The retrieval system 120 may not build the value of each related object right away, but place an "indirection" object placeholder in the attribute of the source object, and continue the nested query building process. An indirection object is a mechanism to limit the depth of levels to which relationships are followed when related objects are being read. Without such a mechanism, the retrieval system 120 reads an object, all of the related objects and all of their related objects and so on. If it reads arbitrarily complex relationships, this would have a drastic effect on read performance. Indirection objects delay reading of the related objects until they are used. Indirection objects use an object placeholder to hold queries until the relevant relationships are accessed. Thus, the execution of the nested queries may be deferred through indirection objects until any of the source objects relationship is accessed at the first time.

By specifying the batch readable relationships on the source query, each source query for each source objects for a many-to-many mapping checks all of the mappings relating to the source object to see if any of the relationships of the source objects should be batched. Thus, it ensures that nested queries against that related relationships are optimized or batch read.

Generation of the nested query at step 152 depends on the type of the relationship between the parent objects and the lower level objects. When the relationship is one-to-one or many-to-many, the retrieval system 120 may use a known method for generating a query for single level relationship objects. For example, as shown in FIG. 1A, objects in Item 12 may be added with a one-to-one reference back to Orderdetail 10 as indicated with arrow 14. In that case, the retrieval system 120 may use the back reference 14 to generate the nested query for retrieving Item objects from ITEM 32 in the database 20. For a one-to-many relation, the retrieval system 120 may also use the mapping meta-data to generate the retrieval query as described in co-pending application Ser. No. 09/920,789 entitled "System and method for managing object to relational one-to-many mapping" filed on Aug. 1, 2001 by Yaoping Wang and James Bryce Sutherland, which is incorporated herewith by reference.

Figure 5:
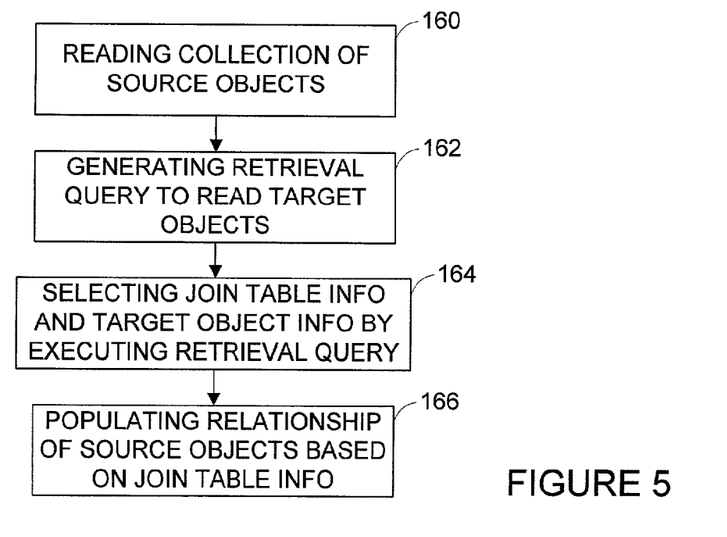
FIG. 5 is a flowchart showing a retrieval of target objects in accordance with another embodiment of the present invention.

When the relationship with nested objects is many-to-many, the retrieval system 120 generates the query as shown in FIG. 5.

When a collection of source objects is read from the database (160), the retrieval system 120 generates a retrieval query to read all target objects for the source objects (162). The retrieval system 120 executes the retrieval query on the database, and selects target object information and join table information from the many-to-many join table (164). The join table information is used for matching the target objects and the source objects. The retrieval system 120 further executes the retrieval query to populate the relationship of the source objects with the target objects using the join table information (166).

Figure 6:
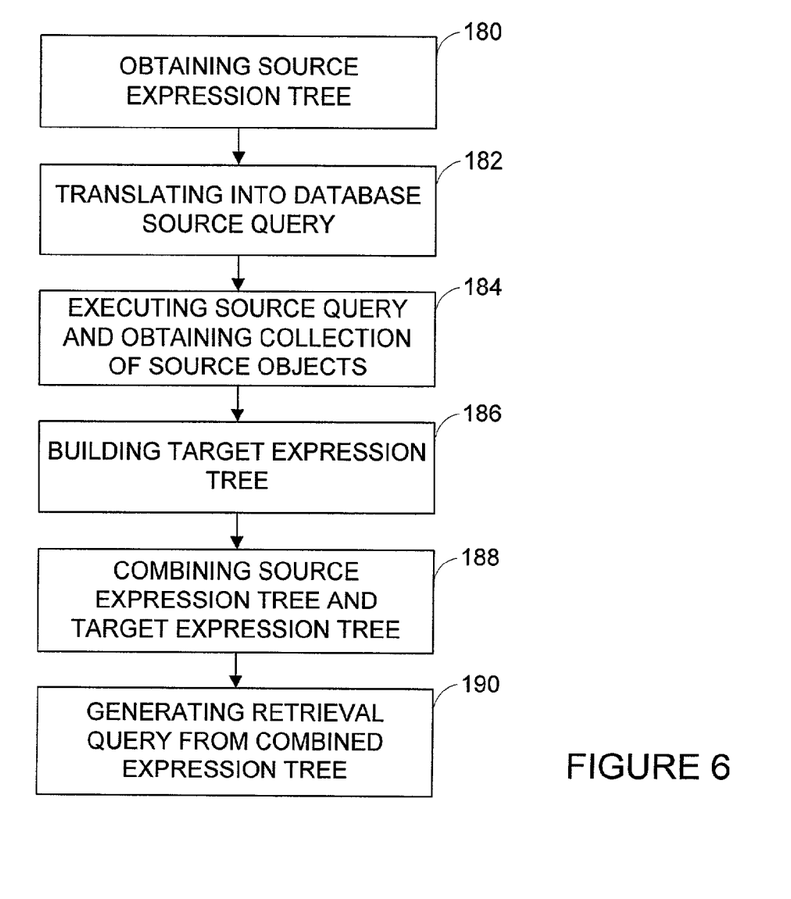
FIG. 6 is a flowchart showing generation of the retrieval query.

FIG. 6 shows details of the reading of the collection of source objects at step 140 and the generation of the retrieval query at step 142. The retrieval system 120 uses expression trees.

An expression is a querying mechanism that allows queries based on the object model in an object query language. It defines querying criteria. An expression query written using an expression may be translated into SQL. An SQL query has a "select" clause and "where" clause. The select clause defines the tables from which the data is to be read. The where clause defines the conditions of the query. An expression allows one to define these "where" clauses in an object query language. Expressions may be combined together through AND and OR operations.

An expression tree is a tree representing querying criteria, e.g., the SQL where clause, for related objects. An expression tree representing many-to-many relationships between objects includes the many-to-many join between the target table and join table. For the example shown in FIG. 2B, the expression tree may be expressed as follows:

(((proj_emp.projectid) (=) (proj.projectid)) (and) ((proj_emp.empid) (=) (emp.empid)))

This is called an "expression tree" because it is viewed as a tree with each ( ) as a node.

An expression tree may be created from the mapping meta-data stored in the meta-data storage 104. The mapping meta-data includes a list of key/value pairs, e.g., <key>proj_emp.projectid</key> <value>proj.projectid</value>

<key>proj_emp.empid</key> <value>emp.empid</value>

The mapping meta-data may also be specified through API code which gives more flexibility, e.g., expb.getField("projectid").equal(joinTable.getField ("projectid").and(expb.getParameter("empid").equal(joinTable.getField(empid"))

Also, the expression tree may be created through XML or graphical mapping tool, e.g., mapping tool 102, by the user for their queries.

In order to read the collection of source objects (140), a read request is typically defined by the user or the application. A read request may be defined by mapping system 100 or retrieval system 120 in case of traversed relationships. Based on the read request, a read query is specified through a query language at the object level. The query language may be the expressions, i.e., an expression tree, or something that can be converted to the expression tree (e.g., Enterprise Java Bean Query Language (EJBQL), mapping/query meta-data) (180). The expression tree for the source objects, i.e., source expression tree, is translated into the database's query language (182). The translated database query is executed on the database through the database access system, resulting in obtaining the source rows. The source rows are then translated into the source objects (184).

In order to generate a retrieval query for all of the relevant target objects for all of the source objects, the retrieval system 120 builds from the mapping meta-data a target expression tree defined by the many-to-many relationships (186). The target expression tree includes the join between the target table and the join table.

The retrieval system 120 combines the source expression tree and the target expression tree (188). The expression trees may be combined through an AND operation. For examples, consider a source expression tree such as:

((salary(Employee)) (>) (100000))

A target expression tree is:

(((EMPLOYEE.EMPLOYEE_ID) (=) (PROJECT_EMPLOYEE.EMPLOYEE_ID)) (AND) ((PROJECT_EMPLOYEE.PROJECT_ID) (=) (PROJECT.PROJECT_ID)))

The combined expression tree is:

(((salary (Employee)) (>) (100000)) (AND) (((EMPLOYEE.EMPLOYEE_ID) (=) (PROJECT_EMPLOYEE.EMPLOYEE_ID)) (AND) ((PROJECT_EMPLOYEE.PROJECT_ID) (=) (PROJECT.PROJECT_ID))))

The retrieval system 120 generates the retrieval query from the combined expression tree (190). Thus, the retrieval query is the source query joined with a target query. For the above example, the generated query is:

> Read all Projects and PROJECT_EMPLOYEE data
> where (((salary (Employee)) (>) (100000))
> (AND) (((EMPLOYEE.EMPLOYEE_ID) (=)
> (PROJECT_EMPLOYEE.EMPLOYEE ID))
> (AND) ((PROJECT_EMPLOYEE.PROJEC-
> T_ID) (=) (PROJECT.PROJECT_ID))))

Figure 7:
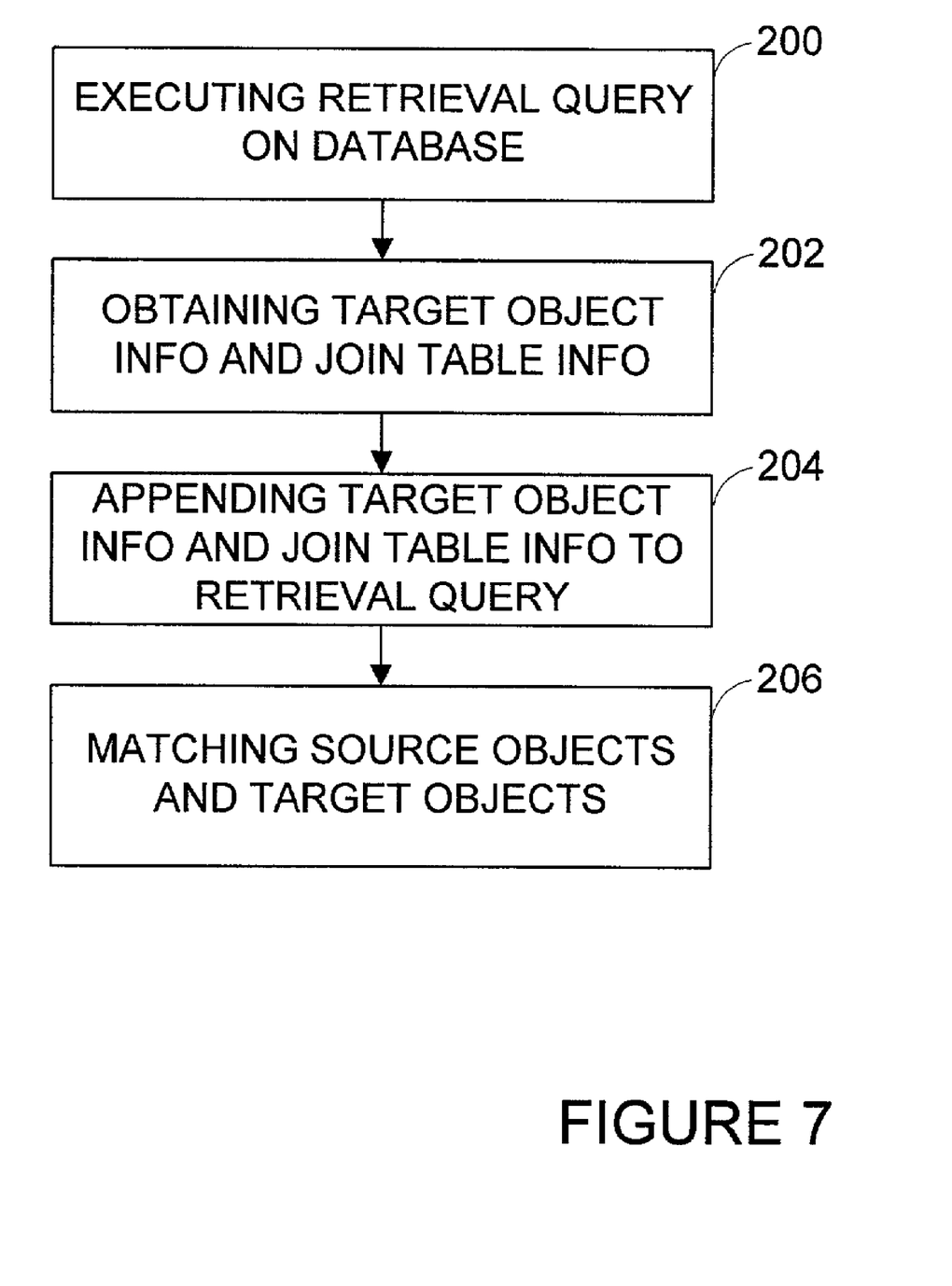
FIG. 7 is a flowchart showing selection of join table information.

FIG. 7 shows details of the selection of the target object information and join table information at step 144, and the population of the relationship at step 146.

The retrieval system 120 executes the retrieval query on the database (200). It obtains the target object information and the join table information from the many-to-many join table (202). The join table information includes the foreign key values. The retrieval system 120 appends the target object information and the join table information to the retrieval query (204). The information is appended to the "select" clause of the SQL select statements. For example, Select PROJECT.*, PROJECT_EMPLOYEE.* FROM EMPLOYEE, PROJECT, PROJECT_EMPLOYEE WHERE . . .

When the source objects are being built, or if indirection is used when any of the source objects relationship is accessed, the relationship of the source objects is populated with the target objects. During this population of the relationship, the retrieval system 120 matches the source objects and the target objects together in memory, using the join table foreign key values (206) and the source objects primary key values. Thus, the source objects are matched with their corresponding target objects.

If the many-to-many target objects have nested objects, as shown in FIG. 4, the generation of a nested query at step 152 to the retrieval of the related objects at step 156 passes the expression tree to nested levels. At each level, an expression tree is appended to the upper level expression tree, and then passed on to the next level.

The above embodiments are described using Java technology as an example of an object based technology and language. However, the applicability of the invention is not limited to Java or Java based technologies. The invention may be applied to other object-based languages and technologies, such as those developed by Microsoft Corporation or Hewlett Packard, with or without appropriate modification as necessary or desired, and such application is within the scope of the invention.

Similarly, while the above embodiments are described using SQL as an example of a query language, the invention is not limited to technologies based on or SQL or employing SQL. The invention may be applied incorporating other database query languages with or without appropriate modification as necessary or desired, and such application is still within the scope of the invention.

The retrieval system of the present invention may be implemented by any hardware or a combination of hardware and software having the above described functions. The hardware may be a general purpose computer or a part of a general purpose computer. The software code, either in its entirety or a part thereof, may be stored in a computer readable memory. Such a computer readable memory is also within the scope of the present invention.

While particular embodiments of the present invention have been shown and described, changes and modifications may be made to such embodiments without departing from the true scope of the invention.

What is claimed is:

1. A method for retrieving target objects stored in a relational database to which an object model is mapped, the method comprising steps of:
   generating a retrieval query to read target objects for a collection of source objects, the collection of source objects having many-to-many relationships with the target objects, the collection of source objects and target objects being respectively stored in one or more source tables and target tables in the database, and the many-to-many relationship being defined in the database by using an intermediate join table of the source tables and the target tables, wherein the retrieval query is generated by:
      obtaining a source expression tree relating to the collection of the source objects;
      building a target expression tree defined by the many-to-many mapping including a join between the target tables and the join table;
      combining the source expression tree and the target expression tree to produce a combined expression tree; and
      generating the retrieval query based on the combined expression tree;
   selecting join table information from the many-to-many join table relating to the collection of source objects and the target objects to enable matching of the target objects and the source objects using the join table information; and
   retrieving the matched target objects by executing the retrieval query on the database;
   wherein retrieving the matched target objects involves automatically generating the query, and wherein the matched target objects include only many-to-many target objects, whereby the matched target objects can be retrieved without requiring a user to provide an explicit list of the matched target objects.

2. The method as claimed in claim 1 further comprising steps of:
   specifying batch readable relationships on a source query for reading the collection of source objects;
   generating a nested query for reading related objects nested in the target objects;
   appending query information of the target objects to the nested query; and
   retrieving the related objects by executing the nested query.

3. The method as claimed in claim 1 wherein the target expression tree building step obtains the target expression tree from mapping meta-data which contains information as to how object classes and relationships of the object model map to tables and foreign keys in the database.

4. The method as claimed in claim 3 wherein the target expression tree building step obtains the target expression tree from mapping meta-data which includes a list of key and value pairs of the many-to-may join table.

5. The method as claimed in claim 1 wherein the selecting step comprises steps of:
   executing the retrieval query on the database for reading the target objects;
   obtaining target object information and join table information from the join table; and
   appending the target object information and the join table information to the retrieval query.

6. The method as claimed in claim 5 wherein the join table information including foreign key values and the appending step appends the foreign key values to the retrieval query.

7. The method as claimed in claim 5 wherein the appending step appends target table information and the join table information to a select clause of a select statement.

8. The method as claimed in claim 5 wherein the retrieving step comprises steps of:
   obtaining the target objects; and
   populating relationships of the source objects with the target objects by comparing a primary key value of each source object with a foreign key value of each target object using foreign key values stored in the retrieval query; and matching each source object with matched target objects.

9. A method for retrieving objects stored in a relational database to which an object model is mapped, the method comprising steps of:
   obtaining nested specification information representing joins relating to a source object and related objects which are joined with the source object with multi-level relationships, the source object and related objects being respectively stored in one or more source tables and target tables in the database, and the multi-level relationship being defined in the database by using an intermediate join table of the source tables and the target tables;
   obtaining parent query information representing a parent query for reading one or more parent objects at a parent level;
   generating a nested query for querying objects of next lower level which is next lower than the parent level, wherein the nested query is generated by:
      obtaining a source expression tree relating to the source object;
      building a target expression tree defined by the multi-level relationship including a join between the target tables and the join table;
      combining the source expression tree and the target expression tree to produce a combined expression tree; and
      generating the nested query based on the combined expression tree;
   appending to the nested query the parent query information and the joins using the nested specification information; and
   retrieving the objects of next lower level by executing the nested query on the database;
   wherein retrieving the objects involves automatically generating the nested query, and wherein the objects include only many-to-many target objects, whereby the objects can be retrieved without requiring a user to provide an explicit list of the objects.

10. The method as claimed in claim 9, wherein the nested specification obtaining step obtains the nested specification information from mapping meta-data which contains information as to how object classes and relationships of the object model map to tables and foreign keys in the database.

11. The method as claimed in claim 9 further comprising a step of specifying batch readable relationships to the parent query for allowing batch reading of the related objects.

12. The method as claimed in claim 11, wherein the specifying step comprises a step of determining the batch readable relationships based on the nested specification.

13. The method as claimed in claim 9 further comprising a step of setting automatic batch reading for automatically generating the nested query for reading objects of lower levels.

14. A computer system for retrieving target objects stored in a relational database to which an object model is mapped, the computer system comprising:
   a query generator for generating a retrieval query to read target objects for a collection of source objects, the collection of source objects having many-to-many relationships with the target objects, the collection of source objects and target objects being respectively stored in one or more source tables and target tables in the database, and the many-to-many relationship being defined in the database by using an intermediate join table of the source tables and the target tables, wherein the query generator generates the retrieval query by:
      obtaining a source expression tree relating to the collection of the source objects;
      building a target expression tree defined by the many-to-many mapping including a join between the target tables and the join table;
      combining the source expression tree and the target expression tree to produce a combined expression tree; and
      generating the retrieval query based on the combined expression tree;
   a join table information handler for selecting join table information from the many-to-many join table relating to the collection of source objects and the target objects to enable matching of the target objects and the source objects using the join table information; and
   a batch reading handler for retrieving the matched target objects by executing the retrieval query on the database;
   wherein retrieving the matched target objects involves automatically generating the query, and wherein the matched target objects include only many-to-many target objects, whereby the matched target objects can be retrieved without requiring a user to provide an explicit list of the matched target objects.

15. The computer system as claimed in claim 14, wherein the join table information handler obtains target object information and join table information from the join table; and
   the batch reading handler appends to the retrieval query target object information and the join table information.

16. The computer system as claimed in claim 15, wherein the join table information handler obtains foreign key values.

17. The computer system as claimed in claim 16, wherein the batch reading handler appends the foreign key values to the retrieval query.

18. The computer system as claimed in claim 17, wherein the batch reading handler has a comparator for comparing a primary key value of each source object with a foreign key value of each target object using the foreign key values appended to the retrieval query; and matching each source object with matched target objects.

19. A computer system for retrieving objects stored in a relational database to which an object model is mapped, the computer system comprising:
   an information receiver for obtaining nested specification information representing joins relating to a source object and related objects which are joined with the source object with multi-level relationships, the source object and related objects being respectively stored in one or more source tables and target tables in the database, and the multi-level relationship being defined in the database by using an intermediate join table of the source tables and the target tables;

a query generator for generating a nested query for querying objects of next lower level to parent objects which are queried by a parent query, wherein the query generator generates the nested query by:
  obtaining a source expression tree relating to the source object;
  building a target expression tree defined by the multi-level relationship including a join between the target tables and the join table;
  combining the source expression tree and the target expression tree to produce a combined expression tree; and
  generating the nested query based on the combined expression tree; and
a batch reading handler for appending to the nested query information of the parent query and the joins using the nested specification information, and retrieving the objects of next lower level by executing the nested query on the database;
wherein retrieving the objects involves automatically generating the nested query, and wherein the objects include only many-to-many target objects, whereby the objects can be retrieved without requiring a user to provide an explicit list of the objects.

20. The computer system as claimed in claim 19, wherein the information receiver obtains the nested specification information from mapping meta-data which contains information as to how object classes and relationships of the object model map to tables and foreign keys in the database.

21. The computer system as claimed in claim 19, wherein the batch reading handler has a batch reading setter for allowing batch reading of the related objects.

22. The computer system as claimed in claim 21, wherein the batch reading setter specifies batch readable relationships to the parent query for allowing batch reading.

23. The computer system as claimed in claim 22, wherein the batch reading setter determines the batch readable relationships based on the nested specification.

24. The computer system as claimed in claim 21, wherein the batch reading setter sets automatic batch reading for automatically generating the nested query for reading objects of lower levels.

25. Computer media storing instructions or statements for use in execution in a computer of a method for retrieving target objects stored in a relational database to which an object model is mapped, the method comprising steps of:
  generating a retrieval query to read target objects for a collection of source objects, the collection of source objects having many-to-many relationships with the target objects, the collection of source objects and target objects being respectively stored in one or more source tables and target tables in the database, and the many-to-many relationship being defined in the database by using an intermediate join table of the source tables and the target tables, wherein the retrieval query is generated by:
    obtaining a source expression tree relating to the collection of the source objects;
    building a target expression tree defined by the many-to-many mapping including a join between the target tables and the join table;
    combining the source expression tree and the target expression tree to produce a combined expression tree; and
    generating the retrieval query based on the combined expression tree;
  selecting join table information from the many-to-many join table relating to the collection of source object and the target objects to enable matching of the target objects and the source objects using the join table information; retrieving the matched target objects by executing the retrieval query on the database;
  wherein retrieving the matched target objects involves automatically generating the query, and wherein the matched target objects include only many-to-many target objects, whereby the matched target objects can be retrieved without requiring a user to provide an explicit list of the matched target objects.

26. A computer program product executing within a computer a method for retrieving target objects stored in a relational database to which an object model is mapped, the product comprising:
  a module for generating a retrieval query to read target objects for a collection of source objects, the collection of source objects having many-to-many relationships with the target objects, the collection of source objects and target objects being respectively stored in one or more source tables and target tables in the database, and the many-to-many relationship being defined in the database by using an intermediate join table of the source tables and the target tables, wherein the module for generating the retrieval query generates the retrieval query by:
    obtaining a source expression tree relating to the collection of the source objects;
    building a target expression tree defined by the many-to-many mapping including a join between the target tables and the join table;
    combining the source expression tree and the target expression tree to produce a combined expression tree; and
    generating the retrieval query based on the combined expression tree;
  a module of selecting join table information from the many-to-many join table relating to the collection of source objects and the target objects to enable matching of the target objects and the source objects using the join table information;
  a module for retrieving the matched target objects by executing the retrieval query on the database;
  wherein retrieving the matched target objects involves automatically generating the query, and wherein the matched target objects include only many-to-many target objects, whereby the matched target objects can be retrieved without requiring a user to provide an explicit list of the matched target objects.

27. Computer media storing instructions or statements for use in execution in a computer of a method for retrieving objects stored in a relational database to which an object model is mapped, the method comprising steps of:
  obtaining nested specification information representing joins relating to a source object and related objects which are joined with source object with multi-level relationships, the source object and related objects being respectively stored in one or more source tables and target tables in the database, and the multi-level relationship being defined in the database by using an intermediate join table of the source tables and the target tables;
  obtaining parent query information representing a parent query for reading tone or more parent objects at a parent level;

generating a nested query for querying objects of next lower level which is next lower than the parent level, wherein the nested query is generated by:
  obtaining a source expression tree relating to the source object;
  building a target expression tree defined by the multi-level relationship including a join between the target tables and the join table;
  combining the source expression tree and the target expression tree to produce a combined expression tree; and
  generating the nested query based on the combined expression tree;
appending to the nested query the parent query information and the joins using the nested specification information; and
retrieving the objects of next lower level by executing the nested query on the database;
wherein retrieving the objects involves automatically generating the nested query, and wherein the objects include only many-to-many target objects, whereby the objects can be retrieved without requiring a user to provide an explicit list of the retrieved objects.

28. A computer program product executing within a computer a method for retrieving objects stored in a relational database to which an object model is mapped, the product comprising:
  a module for obtaining nested specification information representing joins relating to a source object and related objects which are joined with the source object with multi-level relationships, source object and the related objects being respectively stored in one or more source tables and target tables in the database, and the multi-level relationship being defined in the database by using an intermediate join table of the source tables and the target tables;
  a module for obtaining parent query information representing a parent query for reading one or more parent objects at a parent level;
  a module for generating a nested query for querying objects of next lower level which is next lower than the parent level, wherein the module for generating the nested query generates the nested query by:
    obtaining a source expression tree relating to the source object;
    building a target expression tree defined by the multi-level relationship including a join between the target tables and the join table;
    combining the source expression tree and the target expression tree to produce a combined expression tree; and
    generating the nested query based on the combined expression tree;
  a module for appending to the nested query the parent query information and the joins using the nested specification information; and
  a module for retrieving the objects of next lower level by executing the nested query on the database;
  wherein retrieving the objects involves automatically generating the nested query, and wherein the objects include only many-to-many target objects, whereby the objects can be retrieved without requiring a user to provide an explicit list of the retrieved objects.

* * * * *

UNITED STATES PATENT AND TRADEMARK OFFICE
CERTIFICATE OF CORRECTION

| | |
|---|---|
| PATENT NO. | : 7,054,858 B2 |
| APPLICATION NO. | : 09/920790 |
| DATED | : May 30, 2006 |
| INVENTOR(S) | : James Bryce Sutherland |

It is certified that error appears in the above-identified patent and that said Letters Patent is hereby corrected as shown below:

On Title Page, Item (73) Col. 1

Assignee: please delete the name, "OIC Acquisition Corporation" and replace with the name --OIC Acquisition I Corporation--.

Signed and Sealed this

Twenty-second Day of August, 2006

JON W. DUDAS
*Director of the United States Patent and Trademark Office*